Patented July 15, 1952

2,603,625

UNITED STATES PATENT OFFICE 2,603,625

COPOLYMERS OF DICHLOROSTYRENE AND CERTAIN ESTERS OF OLEFIN POLYCARBOXYLIC ACIDS

Roy Chester Feagin, Flushing, and David Bandel, Brooklyn, N. Y., assignors to Mathieson Chemical Corporation, a corporation of Virginia No Drawing. Application September 5, 1946, Serial No. 695,053

5 Claims. (Cl. 260—78.5)

Our invention relates to novel resins formed by the copolymerization of dichlorostyrenes and mixed esters of olefin polycarboxylic acids.

The esters employed according to the invention are most suitably diesters of ethylenedicarboxylic acid, i. e. maleic or fumaric acid, but may be esters of citraconic, itaconic, mesaconic, chloromaleic, or aconitic acid, for example. The applicable esters are characterized in that one of the two or more esterifying radicals contains a polymerizable bond and in that another of the esterifying radicals is free of any polymerizable unsaturated linkage.

Although other unsaturated radicals comprising a polymerizable bond are applicable, crotyl or furyl, for example, the radical containing the polymerizable bond is most suitably one having a terminal methylene group, e. g. vinyl, allyl, methallyl. The esterifying radical free of any polymerizable linkage may be a substituted or unsubstituted straight or branched chain aliphatic radical, aryl radical, alkaryl radical, or alicyclic radical, or it may comprise a saturated heterocyclic ring. Substituents replacing hydrogen atoms in this radical should not, of course, be of such nature as to interfere with the copolymerization reaction or of such nature as to prevent the attainment of the properties desired in the polymer product. An exemplary of suitable radicals may be mentioned: butyl, n-amyl, isoamyl, hexyl, octyl, decyl, octadecyl, phenyl, naphthyl, ortho-cresyl, benzyl, p-chlorobenzyl, betaphenylethyl, tetrahydrofurfuryl, thiophenyl, etc.

A few of the esters which may be employed in the production of the resin are: methyl allyl fumarate or maleate, ethyl methallyl itaconate, iso-butyl allyl maleate, secondary-octyl allyl maleate, n-hexyl methallyl maleate, lauryl allyl citraconate, octadecyl allyl itaconate, cyclohexyl methallyl fumarate, benzyl allyl maleate, o-chlorobenzyl methallyl fumarate, tetrahydrofurfuryl vinyl maleate, tetrahydrofurfuryl allyl maleate, ethyl crotyl maleate, undecyl allyl vinyl aconitate, heptyl benzyl methallyl aconitate, lauryl vinyl monocarobxy aconitate, etc. Diesters in which the saturated radical is a straight or branched chain unsubstituted aliphatic radical containing from 4 to 18 carbon atoms or a heterocyclic radical, such as tetrahydrofurfuryl are particularly preferred.

To produce the resin, the esters are reacted with the dichlorostyrene according to any suitable polymerization procedure. Thus, the reaction may be a mass polymerization involving benzoyl peroxide or lauroyl peroxide, for example, as catalyst, or may be effected in aqueous emulsion, in which event catalysts, such as hydrogen peroxide, urea peroxide and ammonium persulfate, may be used. Suitable emulsifying agents for acid or basic emulsions include ammonium oleate, sodium rosinate and quaternary ammonium compounds, such as cetyl trimethyl ammonium chloride.

In some instances, it is advantageous to so carry out the polymerization that the copolymer forms as small spheres. In this procedure, sometimes identified as "pearl polymerization," the monomeric material is suspended in a suitable medium, conveniently water, in the absence of an emulsifying agent but in the presence of an oil base catalyst, benzoyl peroxide, for example, and a stabilizer, such as calcium phosphate, kaolin, or the like. During the polymerization, mechanical agitation is necessary to prevent coalescence of the droplets of monomer and copious quantities of a cooling agent are used to take up the heat of reaction and to thereby maintain the reaction mixture at the selected operating temperature.

We generally prepare the resin for use in the manufacture of dental prosthesis, such as denture bases, teeth, bridges, crowns, inlays, jackets and the like. In this connection, mass polymerization seems to yield the most suitable polymer or resin. The proportion of catalyst employed in the mass polymerization depends not only on the nature of the catalyst but on the structure and purity of the monomer as well as on other factors. Using benzoyl peroxide a quantity within the range of 0.01-2% on the weight of the monomers is almost always sufficient and in most cases about 0.05-0.1% is adequate. The mixture of monomers with the added catalyst dissolved therein may be heated in a sealed tube or other container, the temperature to which the mixture is heated and the duration of the heating being chiefly dependent on the particular ester involved and the properties desired in the resin. As an example, the mixture may be heated for 1-2 hours at 80° C., and then at 100° C. for another hour, or more. To obtain a resin having a high impact strength, as is generally desirable, it is best to effect the polymerization as rapidly as possible. Where the ester is sufficiently high boiling, as is true of allyl octyl maleate, for example, an open or lightly stoppered container can be used in lieu of a sealed container.

Apart from their use in dental prosthesis, the resins, prepared by mass polymerization and other methods, are useful for many of the other more usual purposes to which plastic polymers and copolymers are put. Thus, molded or cast articles, such as ash trays, insulators, ornaments, etc. may be formed therefrom. Where practicable, casting may be accomplished by polymerizing the mixture of monomers in situ, but it is usually more advantageous to use the powdered copolymer. In the case of dental prosthesis, particularly, the formation of the piece may involve the use of sufficient monomeric material to make a dough of the powdered resin before it is pressed into the mold. When this is done, the mold, after introduction of the dough, is closed and the whole is heated to a temperature and for a period of time sufficient to effect polymerization of the added monomeric material, 1-16 hours at 125°-320° F. being usually sufficient.

Pigments such as zinc phosphate, cadmium red, and titania may be incorporated with the copolymer, as may be substances imparting increased hardness, such as opal, quartz, and the like.

Perhaps the most important properties of our resins as prepared for use in dental prosthesis are low water absorption, low cold flow, and high softening point. Methacrylate resins previously used for the purpose are particularly deficient in the respect of water absorption and cold flow. The dimensional stability, the resistance to abrasion and the wearing qualities of dentures, for example, manufactured from our resins are excellent. Such dentures can be sterilized in boiling water without deformation and they retain their original lustre over long periods.

The hardness of the resins as measured, for example, by means of the Barcol impressor can be readily controlled by changing the proportions of the monomers in the polymerization or through the use of different esters. Many of the resins are adapted for commercial use in the formation of tubes, sheets, rods and other shapes. Injection molding is practicable as to the polymers comprising a low percentage of the ester component.

As previously indicated, the relative amounts of dichlorostyrene and ester employed in the production of the resin may be varied within wide limits, depending upon the properties desired in the resin. Soft, rubbery copolymers may be produced using tetrahydrofurfuryl allyl maleate as the ester where the weight of the ester accounts for from about 25%-50% of the total weight of the monomeric mixture.

Ordinarily, we find it advantageous to employ from about 5 to 30% of the ester—5 to 15% in the case of dental prosthesis. The esters may be used individually or in admixture. Similarly, an individual dichlorostyrene or a mixture of isomeric dichlorostyrenes may be employed. Minor amounts of polymerizable materials capable of inter-reaction with dichlorostyrene and the esters, methyl methacrylate, for example, may be present in the monomeric mixture subjected to polymerization.

The following examples are submitted in further illustration of the invention. In the examples, which are not to be taken as in any way restrictive of the scope of the invention, all parts are by weight:

Example 1

One suitable monomeric mixture for mass polymerization comprises 95% of 2,5-dichlorostyrene and 5% of i-amyl allylfumarate. About 0.1% of benzoyl peroxide is used as catalyst.

Example 2

Another suitable mixture comprises 90% of mixed dichlorostyrenes, 7% of secondary octyl methallyl maleate and about 3% of n-butyl allyl citraconate.

Example 3

Still another suitable mixture comprises 88% of a mixture of 2,4- and 2,5-dichlorostyrene, 10% of n-hexyl allyl maleate and 2% of methyl methacrylate.

Example 4

5 parts of butyl allyl maleate and 94.9 parts of a mixture of isomeric dichlorostyrenes were heated in the presence of 0.1 part of benzoyl peroxide in a stoppered glass tube at 80° C. for two hours and at 100° C. for an additional 1¼ hours. A clear, colorless, resinous copolymer having a Barcol hardness at room temperature of 37 and a cold flow of 1 was obtained. After curing for 16 hours at 130° C., the Barcol hardness measured at 105° C. was 16 while the cold flow remained at 1.

Example 5

5 parts of secondary octyl allyl maleate and 94.9 parts of the mixed isomeric dichlorostyrenes were heated in a stoppered tube for 3 hours. 0.1 part of benzoyl peroxide was used as catalyst. During the first hour the temperature was increased from room temperature to 80° C., during the second hour the temperature was raised to 100° C., and during the third hour the temperature was maintained at 100° C. A clear, colorless, tough copolymer having a Barcol hardness of 38.5 at room temperature and a cold flow of 1.7 was obtained. After curing at 130° C. for 16 hours, the Barcol hardness measured at room temperature and at 105° C. was 41.6 and 29, respectively. The cold flow remained about 1.

Example 6

A mixture of 7 parts of octyl allyl maleate, 92.9 parts of mixed isomeric dichlorostyrenes was copolymerized as in Example 5 in the presence of 0.1 part of benzoyl peroxide. The Barcol hardness of the product before curing was 37.9 at room temperature. After curing for 16 hours at 130° C. the hardness was 37, measured at room temperature, while the cold flow was 1.8. Tested at 105° C. the hardness was 20 and the cold flow was still 1.0.

Example 7

A mixture of 5 parts of n-hexyl methallyl maleate, 94.9 parts of mixed isomeric nuclear dichlorostyrenes and 0.1 part of benzoyl peroxide was heated in a stoppered tube at 80° C. for 2 hours and at 100° C. for 1½ hours. The resulting clear, colorless copolymer had a Barcol hardness of 35.4 and a cold flow of 2.3 before curing. After a cure at 130° C. for 16 hours, the Barcol hardness was 39.4 and the cold flow 6.5, both measured at room temperature.

Example 8

A mixture of 5 parts of octyl allyl maleate, 95 parts of mixed isomeric nuclear dichlorostyrenes and 0.1 part of benzoyl peroxide was heated in a stoppered tube at 80° C. for 4 hours and at 100° C. for 2 hours. The product was subjected to the standard transverse test described in Federal Specifications U-B226-Acrylic Resin. Impact values were measured on a Charpy tester modified to permit the use of small specimens and calibrated in inch-ounces. In four tests of transverse strength, specimens broke under loads of 3500, 4500 and 5000 grams of added weight with deflection readings in inches of 0.240, 0.230, 0.218 and 0.200, respectively. The impact values in check tests were 16.12, 11.64, 18.32 and 15.39 inch-ounces.

*Example 9*

A mixture of 15 parts of benzyl allyl maleate, 84.9 parts of mixed isomeric nuclear dichlorostyrenes and 0.1 part of benzoyl peroxide was warmed slowly to 80° C. during 2½ hours. Thereafter the mixture was held at 80° C. for 2 hours, and then heated for 1½ hours at 100° C. The resulting clear copolymer had a Barcol hardness of 35.6.

*Example 10*

A polymer produced by copolymerizing 10% by weight of octyl allyl maleate with 90% by weight of dichlorostyrene was immersed in water at 37° C. for 30 days. The increase in weight amounted to only 0.66%.

*Example 11*

A copolymer containing 10% by weight of benzyl allyl maleate and 90% of dichlorostyrene when tested under the same conditions showed a water absorption of 0.46%.

*Example 12*

A polymer prepared by copolymerizing 20% of benzyl allyl maleate and 80% of dichlorostyrene absorbed water under the same conditions to the extent of 0.50%.

*Example 13*

Monomeric mixtures were prepared containing 5, 10, 15 and 20% of tetrahydrofurfuryl allyl maleate and the balance dichlorostyrene. Based on the weight of the monomeric mixture, 0.1% of benzoyl peroxide was added. The polymerization process comprised heating at 70° C. for 18.5 hours, at 100° C. for 2 hours and at 130° C. for 2 hours. The copolymers were all clear and tough. The 5% maleate copolymer showed a Barcol hardness of 33 and a cold flow of 2.5, the 10% maleate copolymer corresponding values of 33 and 2.5, the 15% maleate copolymer corresponding values of 27 and 4 and the 20% maleate copolymer corresponding values of 17 and 5.

*Example 14*

Two monomeric mixtures were prepared containing respectively 25% and 50% of tetrahydrofurfuryl allyl maleate with the balance dichlorostyrene. Based on the monomeric mixture, 0.1% of benzoyl peroxide was added and the admixtures polymerized by heating in sealed tubes for 22 hours at 70° C., at 100° C. for 2 hours, and at 130° C. for 2 hours. The copolymers were soft and rubbery in character.

*Example 15*

Monomeric mixtures were prepared containing 25 and 50% of methyl methallyl itaconate with the balance dichlorostyrene. These mixtures were polymerized as described in the preceding example. The 25-75 copolymer showed a Barcol hardness of 28 and a cold flow of 4.9.

It is to be understood that the term "dichlorostyrene" as used herein without qualification refers to compounds in which the two chlorine atoms are attached to the ring nucleus.

We claim:

1. A copolymer of nuclear dichlorostyrene and allyl octyl maleate in a proportion from about 5% to about 15% by weight of ester in the monomeric mixture with the balance of the mixture being substantially all nuclear dichlorostyrenes.

2. A copolymer of nuclear dichlorostyrene and methallyl octyl maleate in a proportion from about 5% to about 15% by weight of ester in the monomeric mixture with the balance of the mixture being substantially all nuclear dichlorostyrenes.

3. A copolymer of nuclear dichlorostyrene and a mixed organic polyester of an acid selected from the group consisting of maleic, fumaric, citraconic, itaconic, mesaconic and aconitic acids, one carboxyl group of such acid being esterified with a radical selected from the group consisting of the vinyl, allyl and methallyl radicals, and at least one other carboxyl group of said acid being esterified with a radical selected from the group consisting of alkyl, aryl, alkaryl, cyclohexyl and tetrahydrofurfuryl radicals being characterized by the absence of any polymerizable bonds, the polyester being present in the monomeric mixture in a proportion of about 5% to about 15% by weight with the balance of the mixture being substantially all nuclear dichlorostyrenes.

4. A copolymer according to claim 3 in which the polyester has one carboxyl group of the acid radical thereof esterified with the vinyl radical.

5. A copolymer according to claim 3 in which the polyester is a vinyl tetrahydrofurfuryl diester.

ROY CHESTER FEAGIN.
DAVID BANDEL.

REFERENCES CITED

The following references are of record in the file of this patent:

UNITED STATES PATENTS

| Number | Name | Date |
|---|---|---|
| 2,318,959 | Muskat et al. | May 11, 1943 |
| 2,403,213 | D'Alelio | July 2, 1946 |
| 2,406,319 | Brooks et al. | Aug. 27, 1946 |
| 2,453,665 | Kropa | Nov. 9, 1948 |
| 2,476,922 | Shokal et al. | July 19, 1949 |

OTHER REFERENCES

Michalek et al.: Chem. and Engr. News, vol. 22, pp. 1559–1563 (Sept. 1944).